Nov. 20, 1956  W. C. SIDENIUS  2,771,229
POURING SPOUT
Filed Dec. 27, 1954
Fig. 1.
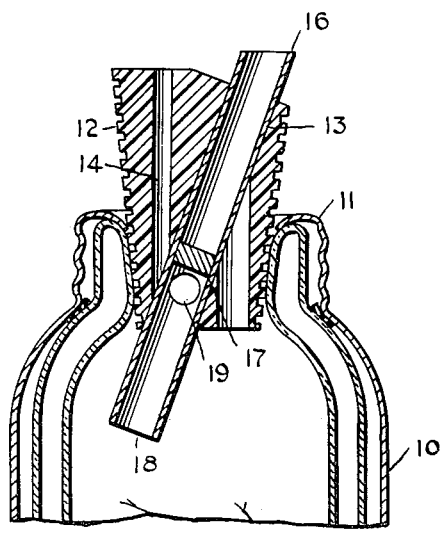
Fig. 3.
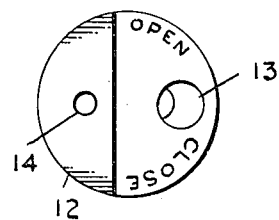
Fig. 4.
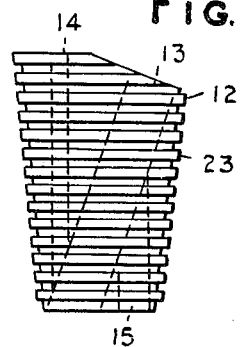
Fig. 2.
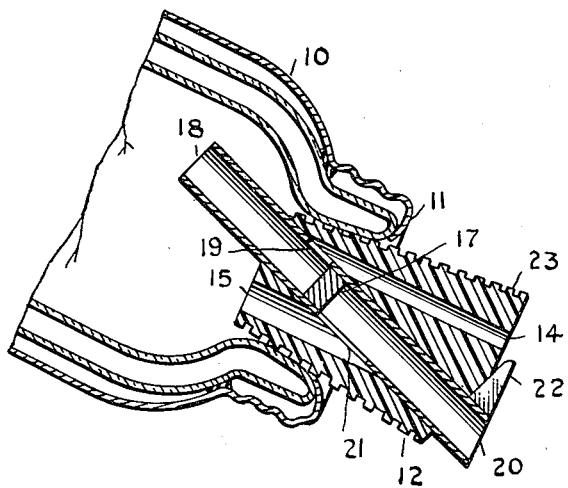
Fig. 5.
Fig. 6.
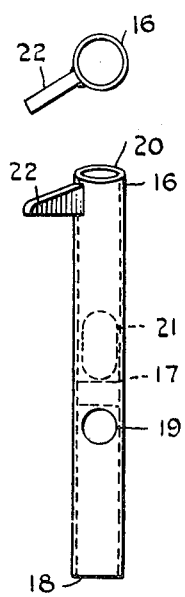
INVENTOR
Widmer C. Sidenius
BY Watson, Cole, Grindle & Watson
ATTORNEYS

United States Patent Office 2,771,229
Patented Nov. 20, 1956

2,771,229
POURING SPOUT

Widmer C. Sidenius, Sandy Hook, Conn., assignor to Production and Marketing Company, Newtown, Conn., a partnership Application December 27, 1954, Serial No. 477,721

8 Claims. (Cl. 222—484)

This invention relates to a new and useful improvement in bottle stoppers provided with a spot type orifice suitable for general use in dispensing liquids. Prior bottle stoppers of the dispensing type have been unsatisfactory for various reasons as none combine all of the advantageous features heretofore found desirable.

One object of this invention is to provide a stopper for a bottle or like liquid container which may be easily removed for filling the container, and which incorporates a convenient dispensing means normally closing the container and sealing it against entrance of air or other possibility of contamination.

A still further object of this invention is to have the member constituting the dispensing means so arranged that the pouring orifice may be opened or closed as desired without disturbing the stopper otherwise.

Still another object of this invention is to provide a closure member for a container such as a vacuum bottle having incorporated within it a dispensing member so that the contents of the bottle may be rapidly withdrawn without contacting the neck of the bottle with the liquid, and so arranged that there is a steady even flow of liquid at any rate of withdrawal desired, thereby avoiding the usual intermittent flow at an uncontrollable rate due to the air entering the container.

In the illustrative embodiment of the invention shown in the drawings, in which like reference numerals designate like parts throughout the several views, Figure 1 is a vertical axial section of the upper portion of a bottle standing erect and with the dispensing stopper in its sealing position.

Fig. 2 is a similar view of the bottle tipped for pouring, the dispensing tube being in its open position;

Fig. 3 is a top view and Fig. 4 is a side view of the stopper; and

Fig. 5 is a top view, and

Fig. 6 is a side view of the dispensing tube or spout.

Referring to the drawings, a double wall vacuum bottle 10, encased in a metal container having a neck portion 11 protecting the mouth of the bottle, is closed by means of the stopper 12 shown in Figures 1 and 2. This stopper has a body made of rubber or flexible plastic material formed with three passageways therethrough, as shown in Fig. 4, the main passageway 13 and the smallest passageway 14 joining each other near the small end of the base of the stopper, and the medium size passageway 15 joining with the passageway 13 more nearly midway of the stopper. The lower surface of the body 12 is at right angles to the axis and the upper surface is partly bevelled, allowing the main passageway 13 to open on and at right angles to its bevelled surface.

Preferably the stopper 12 has flanges 23 molded into the surface thereof to give better contact with the container opening. This stopper may be molded of polyethylene, soft rubber, or of any material that will give good contact with the neck of the container to form a seal therein and at the same time grip the dispenser tube 16 to secure it in place in the passageway 13.

The dispenser tube 16, shown in Figs. 5 and 6, is divided into two parts by means of a cross partition 17 part way down the tube, the lower part being open on the end 18 and having a side opening 19 just below the partition. The upper part of the tube is open on the end 20 and has an opening 21 just above the partition; these openings 19 and 21 being on opposite sides of the tube. An indicator lever 22 is attached to the top of the tube 16, which lever may be used to rotate the tube 16 to open and close the passages 14 and 15 as hereinafter described. The tube 16 is made of rigid material, such as molded plastic or metal.

In use the tube 16 is forced through the body 12 along the main passageway 13, and completely fills the same, forming therewith a liquid tight seal when the lever 22 is turned to the closed position, that is, so that the opening 21 does not register with the passageway 15, but is sealed off by the side walls of the passageway 13. When this tube is in this position, the other opening 19 is also sealed by the side walls of the body 12 as it does not register with the passageway 14. The tube 16 is shown in this position in Fig. 1 wherein the stopper is inserted within the neck portion of the container 10 and pushed in tight, whereupon the tube is sealed by the body 10 and the latter seals the container so that liquid cannot be removed from the container. When the bottle is tipped and lever 22 is rotated into the open position, as shown in Fig. 2, the opening 21 registers with the passageway 15 allowing the liquid to flow into the passageway 15 through the opening 21 and out of the tube opening 20; the tube then operating as a spout. At the same time air will flow in the passageway 14 through the opening 19 and out of the end of the tube 18 into the container to equalize the atmospheric pressure and allow the contents to flow in a constant stream, the closed portion 17 of the tube separating the liquid passageway from the air passage and preventing commingling of the air and liquid.

The above description of the use of the novel stopper and dispensing tube is shown for purposes of illustration and one skilled in the art will see many other applications of this improvement, all of which are included within the invention, which is not limited except by the claims appended hereto.

What is claimed is:

1. A container closure comprising a stopper member, said stopper member having an air passageway therein opening onto the upper surface of the stopper member and continuing part way through the same, said stopper member having a liquid passageway therein opening onto the lower surface of the stopper member and continuing part way therethrough, a main passageway connecting the upper surface with the lower surface of the stopper member and intersecting the liquid and air passageways, a rotatable dispensing tube member within the main passageway and sealing the same, said tube member having a partition intermediate its ends dividing it into an upper portion and a lower portion, opening adjacent this partition in both the upper and lower portions of the tube, said upper opening registering with the liquid passageway and said lower opening registering with the air passageway when the tube member is in the open position, and said openings being sealed by the stopper member when the tube member is rotated into the closed position.

2. A container closure comprising a compressible stopper member, said stopper member having an air passageway therein opening onto the upper surface of the stopper member and continuing part way through the same, said stopper member having a liquid passageway therein opening onto the lower surface of the stopper member and continuing part way therethrough, a main passageway connecting the upper surface with the lower surface of the stopper member and intersecting the liquid and air passageway, a non-compressible rotatable dispensing tube member within the main passageway and sealing the same, said tube member having a partition at right angles to the axis intermediate the ends dividing it into an upper portion and a lower portion, openings adjacent this partition in both the upper and lower portions of the tube member, said upper opening registering with the liquid passageway and said lower opening registering with the air passageway when the tube member is in the open position, and said openings being sealed by the stopper member when the tube member is rotated into the closed position.

3. A container closure comprising a stopper member adapted to be inserted into an opening in the container; a main passageway extending generally longitudinally of said stopper member from the top or external surface thereof to the bottom or internal surface thereof; a first supplemental passageway extending through the top surface of the stopper member, through a portion of the longitudinal extent of the stopper member, and intersecting and opening into said main passageway at an intermediate point therealong; a second supplemental passageway extending through the bottom surface of said stopper member, through a portion of the longitudinal extent of said stopper member, and intersecting and opening into said main passageway at a point spaced upwardly from the point of intersection of said first named supplemental passageway with the main passageway; a rotatably adjustable member received within said main passageway and blocking said main passageway at a point between the respective points of intersection of said supplemental passageways with said main passageway, means carried by said member for simultaneously blocking communication between said main passageway and said first named supplemental passageway and between the main passageway and said second named supplemental passageway, when in one position of adjustment, and for simultaneously opening up such communications when in another position of adjustment.

4. The container closure as set forth in claim 3 in which the rotatably adjustable member is a dispensing tube fitted frictionally in said main passageway and having a mouth portion extending upwardly from the stopper member, a partition extending across the intermediate portion of said tube, and openings in the side walls of said tube above and below said partition, said openings providing simultaneous communication respectively between said main passageway and said supplemental passageways when the tube is rotatably adjusted to register the openings with the supplemental passageways.

5. The contanier closure as set forth in claim 4 in which the outer mouth end portion of said dispensing tube is provided with a lateral extension comprising both a handle for actuating the tube and an indicator for showing its adjusted position.

6. A container closure comprising a stopper member adapted to be inserted into an opening in the container and having imperforate side walls; a straight main passageway extending generally longitudinally of said stopper member from the top or external surface thereof to the bottom or internal surface thereof; a first straight supplemental passageway extending through the top surface of the stopper member, through a portion of the longitudinal extent of the stopper member and intersecting and opening into said main passageway at an intermediate point therealong; a second straight supplemental passageway extending through the bottom surface of said stopper member, through a portion of the longitudinal extent of said stopper member, and intersecting and opening into said main passageway at a point spaced upwardly from the point of intersection of said first named supplemental passageway with the main passageway; a rotatably adjustable member received within said main passageway and blocking said main passageway at a point between the respective points of intersection of said supplemental passageways with said main passageway, means carried by said member for simultaneously blocking communication between said main passageway and said first named supplemental passageway and between the main passageway and said second named supplemental passageway, when in one position of adjustment, and simultaneously opening up such communications when in another position of adjustment.

7. A container closure comprising a stopper member adapted to be inserted into an opening in the container; a straight diagonally inclined main passageway extending generally longitudinally of said stopper member from the top or external surface thereof to the bottom or internal surface thereof; a first supplemental passageway extending through the top surface of the stopper member, through a portion of the longitudinal extent of the stopper member, and intersecting and opening into said main passageway at an intermediate point therealong; a second supplemental passageway extending through the bottom surface of said stopper member, through a portion of the longitudinal extent of said stopper member, and intersecting and opening into said main passageway at a point spaced upwardly from the point of intersection of said first named supplemental passageway with the main passageway; said supplemental passageways being substantially parallel with the axis of said stopper member; a rotatably adjustable member received within said main passageway and blocking said main passageway at a point between the respective points of intersection of said supplemental passageways with said main passageway; means carried by said member for simultaneously blocking communication between said main passageway and said first named supplemental passageway and between the main passageway and said second named supplemental passageway, when in one position of adjustment, and simultaneously opening up such communications when in another position of adjustment.

8. The container closure as set forth in claim 7 in which the portion of the top surface of the stopper member through which the dispensing tube opens is bevelled so that the plane of said portion is at right angles to the axis of the diagonally disposed tube and main passageway.

References Cited in the file of this patent

UNITED STATES PATENTS

| 868,691 | Orton | Oct. 22, 1907 |
| 2,314,167 | Shaw | Mar. 16, 1943 |